United States Patent Office 3,577,343
Patented May 4, 1971

3,577,343
DIBENZAZEPINE COMPOUNDS AS STABILIZER FOR OXIDIZABLE ORGANIC COMPOSITIONS
Hans Jakob Peterli, Fullingsdorf, Switzerland, and Donald Richard Randell, Stockport, England, assignors to Geigy Chemical Corporation, Greenburgh, N.Y.
No Drawing. Division of application Ser. No. 588,225, Oct. 20, 1966, now Patent No. 3,475,412, which is a continuation of application Ser. No. 523,539, Jan. 28, 1966, which is a continuation-in-part of application Ser. No. 424,210, Jan. 8, 1965, which in turn is a continuation-in-part of application Ser. No. 158,169, Dec. 8, 1961. This application Oct. 27, 1969, Ser. No. 870,959
Int. Cl. C10m *1/32;* C08f *45/60*
U.S. Cl. 252—51.5                                           7 Claims

ABSTRACT OF THE DISCLOSURE

Oxidizable organic materials are rendered less susceptible to oxidative deterioration by incorporation of an effective amount of a compound from the group of

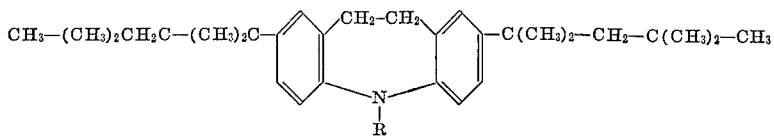

and an N-substituted azepine compound of the formula

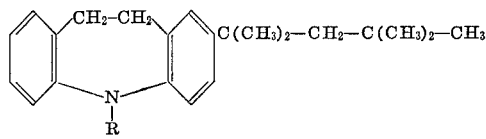

in which formulas R is a member selected from the group consisting of hydrogen, alkyl having from 1 to 12 carbon atoms, hydroxy-substituted lower alkyl, phenyl-substituted lower alkyl, benzoyl and alkanoyl with 1 to 8 carbon atoms.

---

This application is a division of application Ser. No. 588,225, filed Oct. 20, 1966 (now U.S. Pat. No. 3,475,412) which is a continuation of application Ser. No. 523,539, filed Jan. 28, 1966 (now abandoned), which is a continuation-in-part of application Ser. No. 424,210, filed Jan. 8, 1965 (now abandoned), which is a continuation-in-part of application Ser. No. 158,169, filed Dec. 8, 1961 (now abandoned).

This invention relates to a method for rendering sensitive substances less susceptible to oxidative deterioration More particularly it concerns the stabilization of organic substances that are sensitive to oxygen or oxidation, as well as the compositions of matter containing these substances and certain antioxidants more closely defined below.

It has now been found that the deterioration or decomposition which occurs upon exposure of oxidizable materials, especially organic materials, to the atmosphere can be at least reduced by means of a new class of antioxidant substances.

When formulating lubricating oil compositions and, in particular, the synthetic oils that are used as lubricants for turbo-propeller and turbo-jet engines, it is customary to add to the compositions a conventional antioxidant such as phenothiazine or N-phenyl-1-naphthylamine. The fact that modern aero gas turbines, notably those employed to power supersonic aircraft, may necessitate operation for long periods with bulk oil temperatures considerably higher than 200° C., presents especial difficulty since a marked tendency exists for such synthetic lubricants to be defective in oxidative stability, despite the inclusion of conventional antioxidants. Moreover, a troublesome defect associated with the presence of antioxidants such as phenothiazine or N-phenyl-1-naphthylamine in aero gas turbine lubricants, when in service at high temperatures, is the gradual deposition of large amounts of sludge in the lubricants.

By contrast, it has surprisingly been found that formation of this objectionable sludge in such compositions can be diminished or even completely avoided on replacing such conventional antioxidants by an iminodibenzyl compound of the invention as described further below.

It is further known that dialkylated derivatives of conventional antioxidant systems such as diphenylamine and phenothiazine, and synergistic combinations thereof, may be used as antioxidants in ester-based synthetic lubricants, and that these dialkylated derivatives do not have the disadvantage of bringing about the formation of oil-insoluble products in synthetic lubricants at high temperatures which is encountered if phenothiazine itself is used. It was found that the requirements of standard test specifications could be met by incorporating dialkylated phenothiazines and dialkylated secondary amines, thus avoiding the so-called "phenothiazine dirtiness."

However, with the advent of gas turbine engines required to propel aircraft at greater speeds, has come a demand for lubricants which will function satisfactorily at still higher temperatures, at which lubricant compositions comprising the previously suggested dialkylated compounds do not pass the requirements of standard specification tests. For instance, the requirements of the Pratt and Whitney Type II oxidation-corrosion tests, carried out at 425° F. for 48 hours cannot be met by lubricants containing dialkylated derivatives of diphenylamine and phenothiazine, and in particular these derivatives may cause unacceptably heavy corrosion of magnesium. This also applies to compounds of Formula I below, which are otherwise very satisfactory in view of the absence of sludge formation in lubricants containing them.

According to the invention, the several objects explained in the foregoing are achieved by incorporating into such sensitive substances an effective amount of one or several substances of the formula

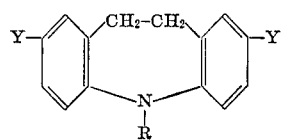   (I)

wherein both Y's represent identical α-branched and preferably tertiary alkyl groups having from 4 to 12, and preferably about 8 carbon atoms.

R is hydrogen, alkyl having from 1 to 12 carbon atoms, e.g. methyl, ethyl, etc., hydroxysubstituted lower alkyl, phenyl-substituted lower alkyl, benzoyl or alkanoyl with 1 to 8 carbon atoms.

Preferably R is hydrogen. Examples of other R substituents are methyl, ethyl, 2-hydroxyethyl, 2-hydroxypropyl, phenylmethyl, 2-phenethyl, acetyl, propinyl and benzoyl.

Antioxidants which are also free from the last-described drawback are those according to a second aspect of the invention, which relates to mono- α-branched or "tertiary" alkyliminodibenzyls of the formula

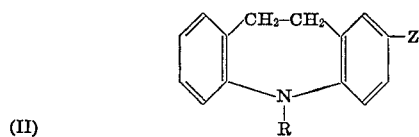

(II)

wherein:

R has the same meaning as in Formula I, and preferably stands for H, and

Z represents α-branched alkyl of from 4 to 12 and preferably of 8 carbon atoms.

Examples of such iminodibenzyl compounds, include 2-mono-t-butyl-iminodibenzyl, 2-mono-t-pentyl-iminodibenzyl, 2-mono- (1:1:3:3-tetramethylbutyl)-iminobenzyl, 2-mono- (1:1:3:3:5:5-hexamethylhexyl) - iminodibenzyl and analogues thereof wherein one or both of the benzene rings is replaced by a 1:2- or 2:1-substituted naphthalene-residue, furthermore 2,8-bis-(t-butyl)-iminodibenzyl; 2,8-bis-(t-octyl)-iminodibenzyl or 2,8-bis-(1:1:3:3:5:5-hexamethylhexyl)-iminodibenzyl.

The mono-(tertiary-alkyl)-substituted iminodibenzyl compounds according to the invention may be produced, for example, by contacting the corresponding unsubstituted iminodibenzyl compound with a 1- or 2-alkene, or a mixture thereof, the total number of carbon atoms in the molecule of the alkene being from 4 to 12.

In general, the 1- and the 2-alkenes react to produce the same mono-tertiaryalkyl-iminodibenzyl. For example, isopentene (consisting mainly of 2-methylbutene-1), di-isobutylene (a mixture of 2:4:4-trimethylpentene-1 and 2:4:4-trimethylpentene-2), porpylene dimer (consisting mainly of 2-methylpentene-1) and tri-isobutylene (a mixture of 2:4:4:6:6-pentamethylheptene-1 and 2:4:4:6:6-pentamethylhepene-2) may be reacted with an iminodibenzyl starting material to produce the mono-tertiary (1:1 - dimethylpropyl) - iminodibenzyl, mono-tertiary (1:1:3:3-tetramethylbutyl)-iminodibenzyl, mono-tertiary (1:1-dimethylbutyl) - iminodibenzyl, and mono-tertiary (1:1:3:3:5:5- hexamethylhexyl)- iminodibenzyl, respectively.

The reaction with the alkene may be carried out by heating the reactants together at an elevated temprature, preferably at a temperature in the range from 100° to 250° C., and is preferably conducted under substantially anhydrous conditions. The reaction is advantageously effected in the persence of a Friedel-Crafts catalyst, for instance in the presence of aluminum chloride. The desired monoalkylated compound may be isolated from the reaction product, and if desired purified, by conventional means, for example by fractional distillation or crystallization.

The present invention also comprises compositions of organic materials susceptible to oxidative deterioration containing a di-alkyl substituted iminodibenzyl of Formula I or a mono-tertiaryalkyl-substituted iminodibenzyl, respectively, as hereinbefore defined, as antioxidant.

Preferred antioxidant agents according to the invention are those falling under the formulas

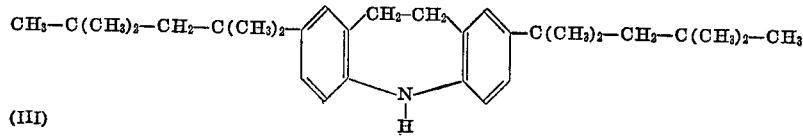

(III)

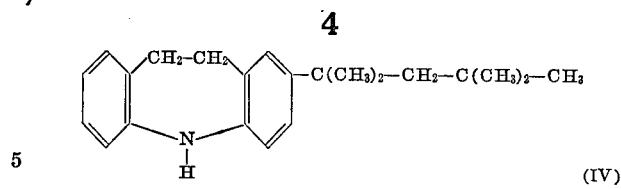

(IV)

respectively, on account of their particularly good freedom from sludge formation and, especially in the case of compounds of Formula IV, also of freedom from causing corrosion of metal surfaces.

Among the organic materials that can be stabilized, i.e. rendered less susceptible to oxidative deterioration in accordance with this invention, there are, above all, synthetic lubricants and synthetic addition polymers.

More in particular, the organic materials that can thus be stabilized, comprise polymeric material, especially synthetic polymers of the "addition" type. These include homopolymers and copolymers of vinyl and vinylidene monomers. Hydrocarbon addition polymers of ethylenically unsaturated monomers and/or those containing the C=C double bonds and tertiary carbon atoms are especially suitable for stabilization according to the invention. Examples of such hydrocarbon addition polymers are synthetic rubbers (polybutadiene), conventional high density polyethylenes and conventional isotactic polypropylenes.

Synthetic organic lubricants constitute a second preferred group of organic materials stabilizable according to the invention.

A particularly valuable class of such stabilizable organic substances are synthetic lubricants based on a diester of a dibasic acid and monohydric alcohol, for example dioctyl sebacate or dinonyl adipate; or monocarboxylic fatty acid esters of trimethylol alkanes, e.g. trimethylolpropane tripelargonate or trimethylolpropane tricaprylate as well as reaction products of one or more 2,2,4-trimethylol pentanol, neopentyl glycol, trimethylolpropane and especially tetraesters of penta- and dipentaerythritol and one or more pelargonic, propionic, n-heptanoic, caprylic, n-decanoic, sebacic, adipic and azelaic acids as produced by conventional esterification analogous to the preparation of trimethylolpropane tripelargonate; e.g. pentaerythritol tetracaprylate. A further valuable class of oxygen-containing organic substances are synthetic lubricating oils based on polyesters such as e.g. complex liquid esters which are products from polyvalent alcohols, saturated aliphatic and/or aromatic dicarboxylic acids having no hydroxy groups and saturated aliphatic and/or aromatic monocarboxylic acids having no hydroxy groups.

These synthetic lubricating oils can be endowed with a substantially increased resistance to oxidation, especially at temperatures well in excess of 200° C. by the incorporation thereinto of a minor amount of at least one of the compounds of Formulas I and/or II, respectively. The liquid complex esters can be prepared by reacting in one or more stages (a) a saturated aliphatic non-hydroxylated monocarboxylic acid having from 1 to 18 carbon atoms or an aromatic non-hydroxylated monocarboxylated acid having from 7 to 15 carbon atoms or an aromatic non-hydroxylated monocarboxylic acid having from 7 to 15 carbon atoms or a mixture of same, (b) a saturated aliphatic polyhydric alcohol having fram 5 to 15 carbon atoms and having the formula

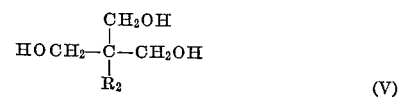

(V)

wherein $R_2$ is a member selected from the group consisting of an alkyl having from 2 to 4 carbon atoms and a —$CH_2OR_3$ wherein $R_3$ is a member selected from the group consisting of hydrogen, aliphatic hydrocarbon containing 5 to 10 carbon atoms and oxygenated hydrocarbon containing 5–10 carbon atoms, and (c) a saturated aliphatic non-hydroxylated dicarboxylic acid having from 4 to 14 carbon atoms or an aromatic non-hydroxylated dicarboxylated acid having from 8 to 12 carbon atoms or a mixture of same, the relative proportions of (a), (b) and (c) being such that the viscosity of the ester so prepared is from 5 to 250 centistokes at 210° F.

Suitable monocarboxylic acids (a) are capric acid (decanoic acid), n-valeric acid (pentanoic acid), isovaleric acid (3-methylbutanoic acid), enanthic acid (heptanoic acid), caprylic acid (octanoic acid), pelargonic acid (nonanoic acid), propionic acid (propanoic acid), and benzoic acid (benzene carboxylic acid).

Suitable polyhydric alcohols (b) are 1:1:1-trimethylol propane, 2-methyl-2-n-propyl-1,3-propane diol, neopentyl glycol (2,2-dimethyl-1,3-propane diol), pentaerythritol, dipentaerythritol and tripentaerythritol.

Suitable dicarboxylic acids (c) are adipic acid, sebacic acid, azelaic acids and phthalic acid. Acids which form anhydrides may be used in that form, e.g. phthalic anhydride.

The reaction may be carried out in the presence of an esterification catalyst such as p-toluene sulfonic acid, sodium bisulfate, potassium pyrosulfate, a tetraalkyl titanate, titanium tetrachloride or a molecular sieve catalyst. Molecular sieves are naturally-occurring or synthetic zeolites which have the property of separating straight chain hydrocarbons from branched chain and cyclic hydrocarbons.

Merely to illustarte a preparation of said liquid complex esters, 2 mols of trimethylol propane, 12 mols of n-heptanoic acid and 1 mol of sebacic acid and about 50 mols of toluene as a water entrainer are heated under reflux in a flask fitted with a Dean and Stark water trap until water ceases to be evolved. After completion of the reaction, the product is washed with dilute aqueous sodium carbonate solution and dried. The toluene is removed by stripping under reduced pressure on a water bath and the refining of the product is completed by stripping to a temperature of 200° C. at 0.1/0.2 mm. of mercury. A similar liquid complex ester can be obtained by employing 10 molar proportions of caprylic acid, 4 molar proportions of trimethylol propane and 1 molar proportion of sebacic acid in place of the foregoing 2 mols of trimethylol propane, 12 mols of n-heptanoic acid and 1 mol of sebacic acid.

The above enumeration of organic materials susceptible to oxidative deterioration is not intended to be a limitation but merely serves to illustrate the wide applicability of the new antioxidants. Other organic compounds that can be readily stabilized are conventional synthetic lubricants, hydrocarbons such as tetraline, vitamins, essential oils, ketones and ethers.

Moreover the new antioxidants can be used in multi-ingredient compositions, i.e. compositions containing at least one of the organic substances or a mixture of same which are sensitive to oxidative deterioration and one or more other inorganic and/or organic substances, e.g. ethanolic solutions or aqueous emulsions of the oxidative susceptible organic substances.

The compositions of the antioxidants of the invention and these materials may also contain other constituents, for instance plasticizers, pigments or fillers if the organic material is a polymer, or load carrying additives, viscosity index improvers or pour-point depressants if the organic material is a lubricant. If desired, a metal deactivator may be present in the composition; for example benzotriazole or a copper-protecting derivative of benzotriazole may be present, preferably in a concentration wthin the range of from 0.01% to 1% by weight based on the total weight of the composition.

The stabilizing compounds of Formulas I and II according to the invention are employed in effective amounts, i.e. in amounts of 0.001 to 5% by weight, calculated on the weight of the organic material to be stabilized; and preferably they are used in amounts of 0.1% to 5%, and optimally from 0.5 to 3.5%.

The compositions according to the second aspect of the invention may contain from 0.1% to 10% by weight of the monoalkylated compound of the invention and preferably from 0.5% to 5% by weight based on the total weight of the composition; if the composition is a synthetic lubricant, the concentration is preferably within the range of from 1.5% to 4% by weight based on the total weight of the lubricant composition.

The specific amount of stabilizer will depend not only on the compositions to be stabilized but on the conditions under which the compositions should be kept stable. Here external conditions come into play, e.g. when the compositions are to be kept stable at room temperature less antioxidant of Formulas I or II is required than when the same compositions are to be kept stable at 200° F.

The stabilizers can be incorporated into the compositions to be stabilized in the conventional manner, e.g. manual mixing or mechanical mixing. The mode of preparation is not critical and will depend on the type of composition to be stabilized.

As indicated above, the optimal amounts of stabilizer to be used differ and depend, primarily, on the nature of the carrier material as well as on the conditions to which it is to be subjected. The figures provided in the examples herein give certain indications for individual carrier materials and antioxidants. Some of the antioxidants of the invention have a rather specific protective action.

Compared with the antioxidants previously used, those according to the invention, when employed in comparable amounts under the same conditions, often have a better and/or longer action. Among the known antioxidants compared with the antioxidants according to the invention, there are especially phenothiazine and unsubstituted iminodibenzyl.

The following examples serve to illustrate the invention without in any way limiting it to same. Where not otherwise expressly stated, parts and percentages are by weight; the relationship of parts by weight to parts by volume is as that of grams to cubic centimeters. The temperatures are in degrees centigrade, if not otherwise stated.

EXAMPLE 1

195.3 parts by weight of iminodibenzyl were heated with 140.3 parts by weight of di-isobutylene (a mixture of 75% of 2:4:4-trimethylpentene-1 and 25% of 2:4:4-trimethylpentene-2) in the presence of 2.2 parts by weight of anhydrous aluminum chloride for 15 hours while maintaining the temperature within the range from 108° to 146° C.

The product was a mixture of mono- and di-(tertiary-octyl)-iminodibenzyl with unreacted iminodibenzyl. The desired 2-mono-(tertiary-octyl)-imondibenzyl was separated from the other constituents of the reaction product by fractional distillation and was recrystallized from aqueous ethanol.

2-p-(tertiary-octyl)-imondibenzyl thus obtained has a melting point of 106° C.

The conversion rate achieved was 38% calculated on iminodibenzyl as starting material.

EXAMPLE 2

(a) 195.3 parts by weight of iminodibenzyl, 336 parts by weight of di-isobutylene (a mixture having the same composition as that used in Example 1) and 16.7 parts by weight of anhydrous aluminum chloride were heated in a pressure vessel at 180° to 190° C. for 1 hour. The reaction product was extracted with chloroform and washed with aqueous sodium hydroxide. The solvent was then removed and the residue was fractionally distilled.

2-mono-(tertiary-butyl)-iminodibenzyl was present in the distillate fraction of boiling point range 134° to 158° C. at 0.005 millimeter of mercury pressure and was isolated and purified by crystallization from aqueous ethanol. The product obtained had melting point 106° C.

(b) 2,8 - bis - (t - butyl)-iminodibenzyl having melting point 160° C. and unreacted iminodibenzyl were also isolated from the crude reaction product by fractional distillation followed by crystallization of the main fractions.

(c) 25.1 parts of 2-mono-t-butyl-iminodibenzyl are mixed with 15 parts of benzoxylchloride and 20 parts by volume of dimethyl-aniline in 100 parts by volume of chlorobenzene and heated for 12 hours to boiling under reflux. After cooling, the reaction mixture is poured onto 100 parts by volume of 2-normal hydrochloric acid, the resulting mixture is extracted with aqueous sodium carbonate solution and then with water, the organic phase is then separated and evaporated to dryness. The residue is distilled in an apparatus for molecular distillation and 2-t-butyl-5-benzoyl-iminodibenzyl is obtained.

(d) 42 parts of 2,8-di-(1′,1′,3′,3′-tetramethyl-butyl)-iminodibenzyl and 30 parts of benzyl chloride are mixed with 500 parts by volume of benzene and a suspension of 5 parts of sodium amide in 100 parts by volume of toluene are added dropwise during 5 hours. The mixture is then boiled for 20 hours under reflux, 10 parts of water are then added, the mixture is filtered and solvent eliminated therefrom by distillation until an oily residue is obtained which is subjected to molecular distillation; 2,8-di-(1′, 1′, 3′, 3′ - tetramethyl - butyl) - 5 - benzyl-iminodibenzyl is obtained.

The results of the tests are given in Table I. In this table the final acid value is expressed as milligrams of potassium hydroxide per gram; the sludge is expressed as milligrams; and the weight change of the steel specimens is expressed as milligrams per square centimeter. Included in the table are the results of comparative tests carried out under the same conditions but with no additive and with compounds as additives which are other than those of the present invention.

The results in Table I demonstrate the effectiveness of the monoalkylated compounds and their superior properties over related compounds not monoalkylated.

TABLE I

| Example | Additive | Percent additive | Percent viscosity increase at 100° F. | Final acid value | Sludge | Weight change of steel specimens |
|---|---|---|---|---|---|---|
| | None | | 31.7 | 9.9 | 16 | +0.08:+0.07 |
| | Phenothiazine | 1.0 | 12.9 | 3.7 | 617 | +0.11:+0.16 |
| | Iminodibenzyl | 1.0 | 4.4 | 3.5 | Moderate | +0.22:+0.19 |
| 3 | Di-tertiary-octyl-phenothiazine | 2.0 | 14.9 | 8.0 | 11 | +0.63:+0.71 |
| 4 | 2,8-di-tertiary-octyl-iminodibenzyl | 2.0 | 13.9 | 5.9 | 5 | +0.22:+0.19 |
| 5 | 2-mono-tertiary-octyl-iminodibenzyl | 1.5 | 13.6 | 4.5 | 27 | +0.17:+0.19 |

EXAMPLES 6 AND 7

Synthetic ester-based lubricant compositions were produced and subjected to the Pratt & Whitney Type II oxidation-corrosion test. The base fluid was pentaerythritol tetracaprylate and each test was carried out for 48 hours at 425° F. with air at the rate of 5 liters per hour and in the presence of specimens of magnesium alloy, aluminum alloy, copper, silver and steel.

To each lubricant sample had been added the proportions of a phenothiazine- or iminodibenzyl-type additive and benzotriazole as stated in Table II.

The results of the tests are given in Table II which includes comparisons where no additive or an additive other than a monoalkylated compound of the present invention was present. In the table, the acid value increase is expressed as milligrams of potassium hydroxide per gram; the sludge is expressed in milligrams; and the weight change of the specimens as milligrams per square centimeter.

TABLE II

| Ex. | Additive | Percent additive | Percent viscosity increase at 100° F. | Acid value increase | Sludge | Weight change of specimens | | | | |
|---|---|---|---|---|---|---|---|---|---|---|
| | | | | | | Mg alloy | Al alloy | Cu | Ag | Steel |
| | None | | 246.2 | 11.5 | 21.3 | −19.80 | +0.03 | 0.65 | +0.03 | +0.03 |
| | Phenothiazine | 2.0 | 30.2 | 5.8 | 376.5 | +0.14 | +0.07 | −0.22 | +0.18 | +0.08 |
| | Iminodibenzyl | 2.0 | 12.0 | 2.0 | 294.9 | +0.14 | +0.06 | +0.30 | +0.10 | Nil |
| 6 | 2,8-di-tertiary-octyl iminodibenzyl plus | 4.0 | 27.0 | 3.2 | 5.8 | −3.79 | Nil | −1.09 | −0.04 | −0.04 |
| | Benzotriazole | 0.5 | | | | | | | | |
| 7 | 2-mono-tertiary-octyl iminodibenzyl plus | 3.0 | 28.2 | 2.9 | 0.2 | −0.02 | −0.02 | −1.24 | −0.01 | −0.01 |
| | Benzotriazole | 0.5 | | | | | | | | |

EXAMPLES 3 TO 5

Synthetic ester-based lubricant compositions were prepared incorporating a mono-(tertiary-alkyl)-iminodibenzyl of the present invention and subjected to an oxidation corrosion test. The base fluid in each of the tests was trimethylolpropane tripelargonate and each test was carried out for 6 hours at 260° C. (500° F.) with dry air at the rate of 5 liters per hour in the presence of two mild steel specimens having ¾ inch outside diameter and 5/16 inch inside diameter (British standard specification No. 3).

To each lubricant sample had been added 1.5% by weight of a mono-(tertiary-alkyl)-substituted compound in accordance with the invention, based on the total weight of the lubricant composition.

These results demonstrate the ability of the monoalkylated compounds to provide protection to the lubrican oil without the production of oil insolubles and magnesium attack. The dialkylated derivatives used in the comparative tests described inhibit the production of sludge but cause heavy corrosion of magnesium.

EXAMPLE 8

Unstabilized high density polyethylene powder and 0.1% of an anti-oxidant are mixed in a rolling drum and then milled at 160° C. for 30 minutes until homogeneous material is obtained. Sheets 1 mm. thickness are then pressed from this material. 0.2 g. of these sheets is then aged in an oxygen atmosphere at 140° C. and absorption of oxygen is measured.

Table III below shows the time involved for takeup of 5 ml. of oxygen:

TABLE III

| Additive: | Hours |
|---|---|
| None | 7 |
| Iminodibenzyl | 19 |
| N-benzyl-iminodibenzyl | 14 |
| Mixture of 2-mono- and 2,8-di-(1',1',3',3'-tetramethylbutyl)iminodibenzyl and iminodibenzyl, obtained according to Example 9 in the paragraphs following Table IV, the components being in the ratio of 44:7:22 | 71 |

Analogous results are obtained with low density polyethylene. Moreover, isotactic polypropylene is stabilized the same way if the milling is conducted at 170–180° C. and the sheets are pressed at 195–200° C.

EXAMPLE 9

Compositions of matter which can be stored are produced from trimethoylolpropane-tripelargonate and high temperature stabilizers; the content of the stabilizers is given in Table IV. These compositions are tested as described in Example 3 and in amount of the sediment formed is determined by diluting the composition with benzene and filtering through a Gooch crucible with a layer of asbestos.

TABLE IV

| Content of stabilizer in percent | Sediment in mg. | Viscosity increase in percent |
|---|---|---|
| None | 16 | 31.7 |
| Phenyl-α-naphthylamine 1% | 274 | 9.2 |
| 5-ethyl-10,10-diphenyl-phenazasilane 1% | 156 | 12.1 |
| 2-(1', 1', 3',-3'-tetramethylbutyl)-iminodibenzy (Compound IV described below) 1% | 5 | 12.6 |
| 2, 8-bis-(1', 1', 3', 3'-tetramethylbutyl)-iminodibenzyl 1% (Compound described below) | 11 | 15.2 |

30 g. of Hyflo are suspended in 200 g. of marketed di-isobutylene. 6 ml. of concentrated (100%) sulfuric acid are added dropwise to this suspension. After adding 100 g. of iminodibenzyl, the mixture is heated in an autoclave for 4 hours at 190–200°, during which the pressure rises to nearly 20 atmospheres. After cooling to room temperature, the autoclave is amptied. The reaction product is filtered off and the filter cake is washed with hexane. The hexane and di-isobutylene are distilled off from the combined filtrates in vacuo. The crude product, which is the residue, consists of 7% 2,8-bis-(1',1',3',3'-tetramethylbutyl)iminodibenzyl; 44% 2-(1',1',3',3'-tetramethylbutyl)-iminodibenzyl; 22% unreacted iminodibenzyl; and 13% diisobutylene polymers.

This mixture is separated by chromatography with silica gel. 2-(1',1',3',3'-tetramethylbutyl)-iminodibenzyl (M.P. 100°) having the Formula IV and 2,8-bis-(1',1', 3',3'-tetramethylbutyl)-iminodibenzyl (M.P. 139°) having the Formula III are obtained.

The compounds of Formulas III and IV can also be obtained if phosphoric acid or aluminum chloride is used as catalyst. Reaction conditions can also vary; the temperature may vary between 180 and 230° C., and the pressure between 10 and 23 atmospheres, the precise pressure being dependent on the temperature employed. The compounds of Formula IV and Formula III are colorless crystals and are soluble in cyclohexane and benzene.

In the accompanying FIGS. 1 and 2, the infra-red spectra of the Compounds IV and III are given. To take the infra-red spectra, the compounds independently of each other are suspended in the form of a "Nujol" mull. The individual compounds exhibited the characteristic absorption peaks at the following wavelengths:

Compound IV (monoalkyl-substituted) FIG. 1 (microns)

| | |
|---|---|
| 2.94 | 8.82 |
| 6.20 | 10.64 |
| 6.29 | 11.21 |
| 6.64 | 12.24 |
| 6.70 | 13.35 |
| 7.52 | |

Compound III (dialkyl-substituted) FIG. 2 (microns)

| | |
|---|---|
| 2.93 | 8.07 |
| 6.19 | 8.79 |
| 6.65 | 11.29 |
| 7.42 | 12.37 |

The term "N-substituted azepine compound" as employed in the following claims embraces compounds wherein the substituent at the heterocyclic nitrogen is hydrogen, alkyl, hydroxy-substituted lower alkyl, phenyl-substituted lower alkyl, benzoyl or alkyl—CO—. The term "lower alkyl" as used in the specification and claims refers to an alkyl containing 1 to 4 carbon atoms, e.g. methyl, ethyl, etc.

We claim:
1. A lubricant of improved stability consisting essentially of (I) a liquid complex ester lubricant of
  (a) an acid selected from the group consisting of a saturated aliphatic non-hydroxylated monocarboxylic acid having from 1 to 18 carbon atoms and an aromatic non-hydroxylated monocarboxylic acid having from 7 to 15 carbon atoms and mixtures thereof,
  (b) a saturated aliphatic polyhydric alcohol having from 5 to 15 carbon atoms and having the formula

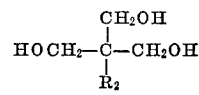

wherein $R_2$ is a member selected from the group consisting of alkyl having from 2 to 4 carbon atoms and a —$CH_2OR_3$ radical wherein $R_3$ is a member selected from the group consisting of hydrogen, aliphatic hydrocarbon containing 5 to 10 carbon atoms and oxygenated aliphatic hydrocarbon containing 5 to 10 carbon atoms, and
  (c) an acid selected from the group consisting of a saturated aliphatic non-hydroxylated dicarboxylic acid having from 4 to 14 carbon atoms and an aromatic non-hydroxylated dicarboxylic acid having from 8 to 12 carbon atoms, and
(II) a member selected from the class consisting of an N-substituted azepine compound of the formula

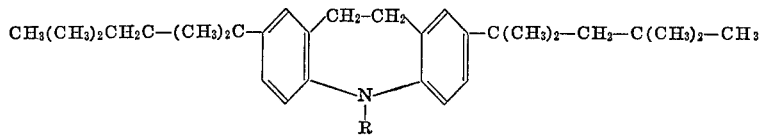

and an N-substituted azepine compound of the formula

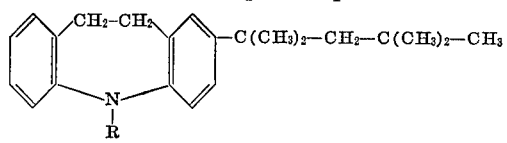

in which formulas

R is a member selected from the group consisting of hydrogen, alkyl having from 1 to 12 carbon atoms, hydroxy-substituted lower alkyl, phenyl-substituted lower alkyl, benzoyl and alkanoyl with 1 to 8 carbon atoms, which component (II) is present in said lubricant in an amount ranging from about 0.001% to 5% calculated on the weight of (I).

2. A lubricant as defined in claim 1, wherein R is hydrogen.

3. A lubricant as defined in claim 1, wherein the azepine compound is of the formula

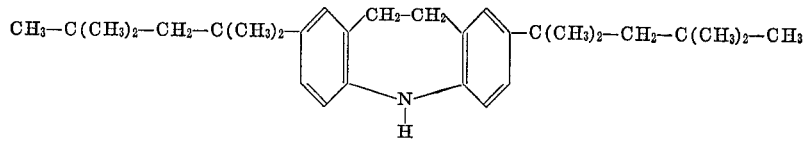

4. A lubricant as defined in claim 1, wherein the azepine compound is of the formula

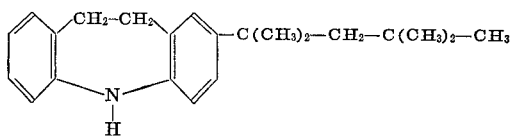

5. A polymeric material of improved stability, consisting essentially of
(I) an addition polymer selected from the group consisting of polyethylene and polypropylene and
(II) a member selected from the class consisting of an N-substituted azepine compound of the formula

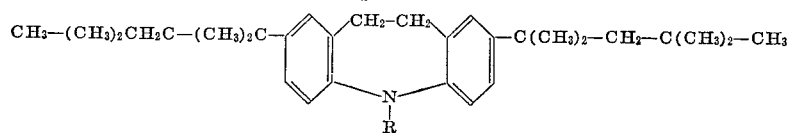

and an N-substituted azepine compound of the formula

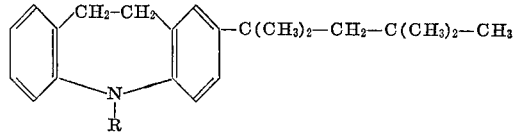

wherein R is a member selected from the group consisting of hydrogen, alkyl having from 1 to 12 carbon atoms, hydroxy-substituted lower alkyl, phenyl-substituted lower alkyl, benzoyl and alkanoyl with 1 to 8 carbon atoms, which component (II) is present in said polymeric material in an amount ranging from about 0.001% to 5% calculated on the weight of (I).

6. A polymeric material as defined in claim 5, wherein the azepine compound is of the formula

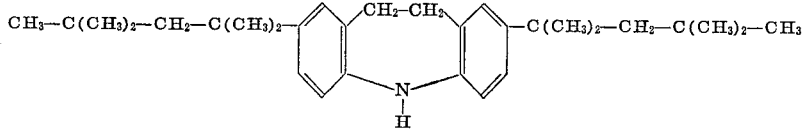

7. A polymeric material as defined in claim 5, wherein the azepine compound is of the formula

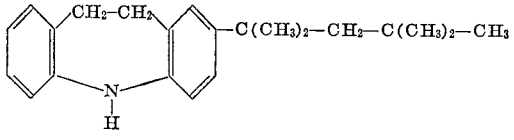

References Cited

UNITED STATES PATENTS

| | | | |
|---|---|---|---|
| 2,037,932 | 4/1936 | Semon | 252—50 |
| 2,757,139 | 7/1956 | Matuszak et al. | 252—565 |
| 3,048,542 | 8/1962 | Tierney et al. | 252—565 |
| 3,048,608 | 8/1962 | Girard et al. | 252—565 |

OTHER REFERENCES

Georgi, Motor Oils and Engine Lubrication, 1950, Reinhold Publishing Co., N.Y., pp. 182–183 (copy available in Scientific Library).

DANIEL E. WYMAN, Primary Examiner

W. J. SHINE, Assistant Examiner

U.S. Cl. X.R.

252—50, 401, 403; 260—45.8